United States Patent [19]

Mertens

[11] Patent Number: 4,904,322

[45] Date of Patent: Feb. 27, 1990

[54] METHOD FOR MANUFACTURING A TENSION BELT

[76] Inventor: Richard O. Mertens, 108 Cooley Dr., Carl Junction, Mo. 64834

[21] Appl. No.: 307,179

[22] Filed: Feb. 3, 1989

Related U.S. Application Data

[63] Continuation-in-part of Ser. No. 28,229, Mar. 20, 1987.

[51] Int. Cl.[4] .............................................. B32B 31/20
[52] U.S. Cl. .................................... 156/196; 156/227; 156/245; 156/297; 156/305; 156/308.2; 156/308.6; 24/265 R; 24/265 H; 101/378; 101/383; 101/415.1
[58] Field of Search ................ 156/60, 157, 182, 265, 156/266, 297, 299, 303.1, 304.2, 304.3, 304.6, 305, 502, 505, 245, 500, 196, 227, 308.2, 308.6; 24/17 A, 265 A, 265 R, 265 EC, 265 H; 101/378, 383, 415.1

[56] References Cited

U.S. PATENT DOCUMENTS

| | | | |
|---|---|---|---|
| 2,069,362 | 2/1937 | Ford | 156/502 |
| 3,213,790 | 10/1965 | McKay | 101/415.1 |
| 3,235,722 | 2/1966 | Gurin | 317/2 |
| 3,897,191 | 7/1975 | Saunders et al. | 425/384 |
| 3,934,509 | 1/1976 | Saunders et al. | 101/415.1 |
| 4,181,549 | 1/1980 | McPhee | 156/69 |
| 4,253,898 | 3/1981 | Rinker et al. | 156/333 |
| 4,386,989 | 7/1983 | Aubry | 156/182 |
| 4,431,863 | 2/1984 | Metzler | 156/54 |
| 4,512,947 | 4/1985 | Wyle et al. | 156/83 |
| 4,563,379 | 1/1986 | Kruger | 156/304.6 |
| 4,595,446 | 6/1986 | Newkirk et al. | 156/356 |
| 4,651,382 | 3/1987 | Krolick | 156/305 |

OTHER PUBLICATIONS

Catalog 85–Triangle dies & supplies, Inc., p. 13.

*Primary Examiner*—Caleb Weston
*Attorney, Agent, or Firm*—William J. Miller

[57] ABSTRACT

An apparatus for securing a printing plate to a flexographic press cylinder includes a first and second end formed of a flexible plastic strip. An elastic strip has first and second ends and a mid-portion. Heat pressure and a liquid solvent are utilized for fusing the first and second ends of the elastic strip to a portion of each of the first and second flexible strips, respectively. The first and second ends of the plastic strips are then bent to form a fold useful for securing the apparatus to the printing plate and to the flexographic press cylinder.

8 Claims, 1 Drawing Sheet

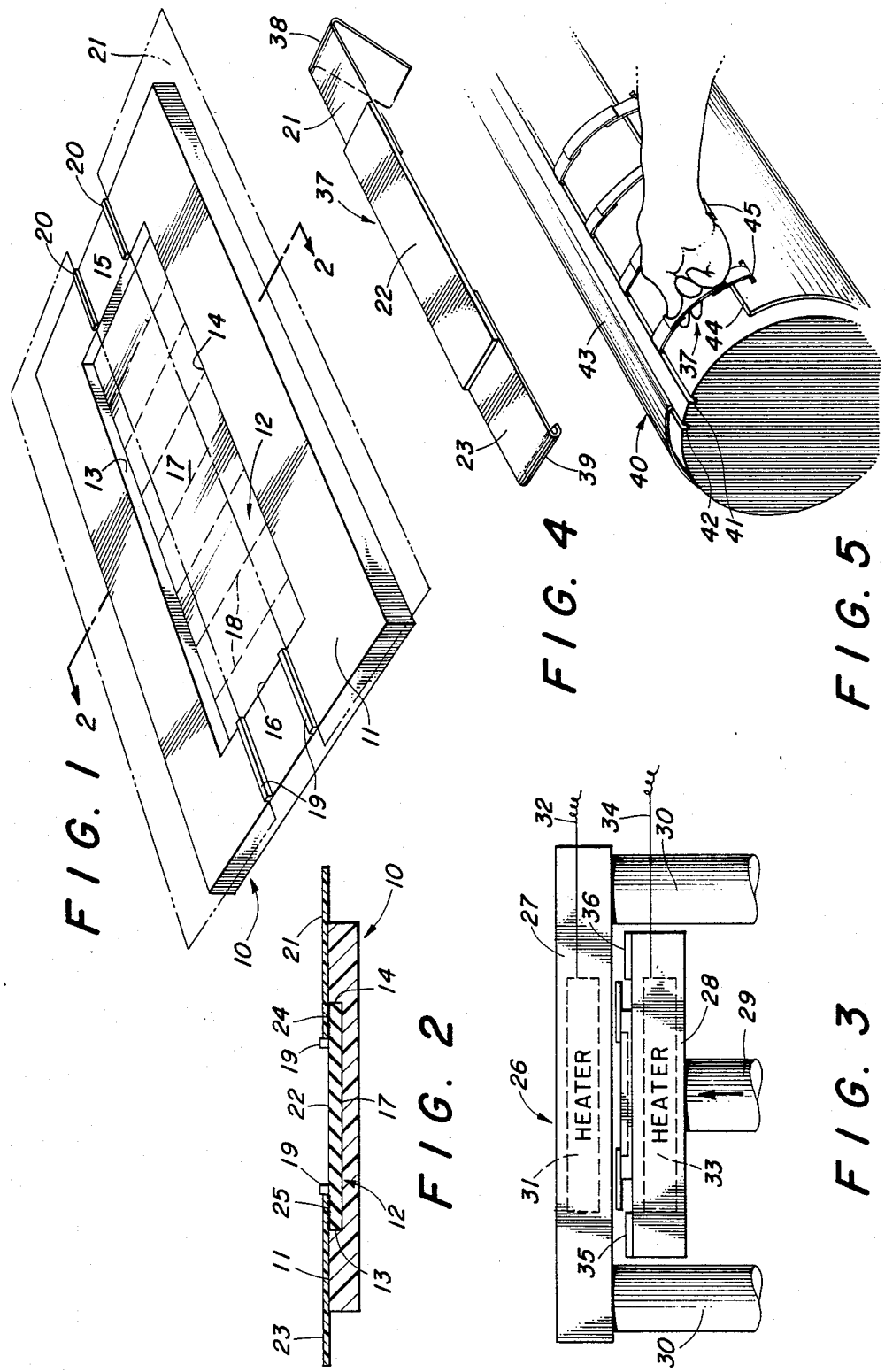

METHOD FOR MANUFACTURING A TENSION BELT

This is a continuation-in-part of co-pending application Ser. No. 028,229 filed on Mar. 20, 1987.

BRIEF DESCRIPTION OF THE PRIOR ART

U.S. Pat. No. 3,897,191 issued to Saunders et al. describes a means for forming a plastic sheet which is attachable to a flexographic press printing cylinder including means for attaching flexible straps to the plastic sheet in order to maintain the plastic sheet against the flexographic roll. The attachment straps include a metal end, a rubber strip and a second metal end. The first metal end is placed in holes in the plastic sheet and the second metal end is placed in a formed groove in the flexographic press roll. Such metal ends tend, on occasion, to become dislodged. When the metal ends become dislodged, they cause severe damage to the flexographic rolls, thus, metal ends in this use are extremely undesirable.

U.S. Pat. No. 3,934,509, to the same inventors as the above described patent, illustrates an improved mounting attachment for a printing plate. This mounting attachment comprises first and second plastic ends which are coupled together by rubber bands to provide a stretchable or flexible inner connection between the first and second plastic ends so that a continuous tension can be applied to the plastic sheet being attached to the press. These strips, while improved over the original attachment strips in that they have plastic ends rather than metal ends, can not be reused once they are attached to a plastic sheet. Further, the attachment locations of the rubber bands tend to fracture causing the tension band to fail.

Another flexible band is illustrated in an catalogue published by TRIANGLE Dies and Supplies, Inc. as shown on page 13. This flexible attachment band has plastic ends and a wide flexible or rubber connection between the plastic ends. The attachment between the rubber and the plastic, however, does not result in a useable bond. Therefore, the ends tend to tear away from the rubber flexible strip quite easily causing failure of the bands and, as a consequence, failure of the printing process.

BRIEF DESCRIPTION OF THE INVENTION

This invention relates to an elastic securing band and the method for manufacturing same. The securing band secures the free end of a printing plate to a flexographic press cylinder. The elastic securing band basically consists of a first end formed of a flexible plastic strip, a second end formed of a second plastic strip, with an elastic rubber strip fused to the first and second flexible strips by the use of heat pressure and a liquid solvent. The ends are then formed into hooks for anchoring the printing plate to the flexographic press cylinder.

The method consists of coating each of the first and second flexible plastic strips over the portion which will contact the elastic band with polyvinyl chloride cement. The elastic band is then placed in a mold with the first and second plastic strips positioned over the rubber strip. Heat and pressure are then applied to the plastic strips and the uncured rubber strip in a manner to vulcanize the rubber strip and fuse the rubber strip to the first and second flexible plastic strips. The downward movement of the press during the heat cycle is limited by shims or other means so that the pressure of the press will not severely flatten the plastic strips during the pressure and heat cycle.

BRIEF DESCRIPTION OF THE FIGURES

FIG. 1 illustrates the Bakelite matrix used to form the elastic securing bands;

FIG. 2 is a sectional taken through lines 2—2 of FIG. 1;

FIG. 3 illustrates the method of forming the elastic securing bands in a vulcanizing press;

FIG. 4 illustrates an elastic securing band; and

FIG. 5 illustrates the method of utilizing the elastic securing bands for connecting a plastic printing plate to a flexographic press cylinder.

DETAILED DESCRIPTION OF THE INVENTION

Referring to all of the FIGURES but in particular to FIGS. 1 and 2, a Bakelite matrix generally referred to by arrow 10 is used as a mold for manufacturing a number of elastic securing bands (see FIG. 4). Bakelite matrix 10 is formed by etching a zinc plate or other suitable material in a manner so that it will appear the reverse of the surface illustrated in FIG. 1. Bakelite matrix 10 is then formed in the usual manner by applying powdered Bakelite over the surface along with a sheet of Bakelite on top of the powdered Bakelite. The zinc plate, along with the powdered and sheet Bakelite, is then subject to heat and pressure so that the configuration or mold shown in FIG. 1 is formed. Bakelite matrix 10 is utilized, as previously stated, for manufacturing a number of elastic securing bands which would be formed by clipping the assembled plastic in a manner to be described.

Referring to FIG. 2, Bakelite matrix 10 comprises an upper surface or mold face 11, a mold cavity 12 which has edges 13, 14, 15 and 16 and a floor 17. Mold floor 17 may be scribed using scribe lines 18 to indicate the location where the elastic securing bands will be later severed to form a plurality of bands. Other indicant, such as the name of the company, etc., can be placed on mold floor 17 since the pressure will transfer the impressions to the rubber strip that will be placed in mold cavity 12. On mold face 11 are formed bosses 19 and 20 for locating plastic strips 21 and 23 (indicated by dotted lines) that will be placed against bosses 19 and 20 to properly position plastic strips 21 and 23 when the molding process is performed.

The depth between upper surface or mold face 11 and mold floor 17 determines the maximum thickness of the elastic securing bands. In the preferred embodiment, this distance is 0.070 plus or minus 0.007 of an inch. However, the depth can vary considerably and still be functional for the attachment of the plastic to the flexographic press cylinder. The basic necessity is for the plastic strips to be thin enough that they will not cause problems when the printing is being formed. Thickness can be, in fact, as much as 0.125 of an inch and still be useful for most purposes.

The method for manufacturing the elastic securing bands is as follows: a piece of uncured synthetic rubber of the type manufactured by B. F. Goodrich Graphics Art Department, referred to by Number 8450SB, is cut to the size of cavity 12 and placed in the cavity so that the width of the cut rubber is against edges 13 and 14 and the ends against ends 15 and 16. Plastic strips 21 and 23, for example, will be of a width which is longer than mold cavity 12 and extends as is illustrated by the dotted lines 21 in FIG. 1 and is illustrated by a piece of plastic in FIG. 2 and labeled 21 and 23. The positioning of both plastic strips 21 and 23 is accomplished by abutting plastic strips 21 or 23, respectively, against bosses 19 and 20 as illustrated in FIG. 1 by the dotted lines.

In order to properly fuse plastic strips 21 or 23 to synthetic rubber strip 22 one important step in the assembly of the mold rubber and plastic illustrated in FIG. 2, is the coating of plastic strips 21 and 23 at locations 24 and 25 with a polyvinyl chloride cement. The coating covers the length of plastic strips 21 and 23 and has a width as wide as the overlap of plastic strip 21 or 23 with synthetic rubber piece 22 so that the contact surface between plastic strip 21 or 23 and synthetic rubber 22 will have a coating of polyvinyl chloride cement.

Once the plastic, rubber and Bakelite matrix is assembled as illustrated in FIG. 2, the entire assembly is placed in a vulcanizing press 26 illustrated in FIG. 3. Vulcanizing press 26 has a top platen 27 and a bottom movable platen 28 which is operated by a hydraulic ram 29. Top platen 27 can be anchored in any one or several ways such as, for example, with anchoring rods 30. Top plate 27 has a heater 31 which can be any usual type such as steam or electric. Heater 31, as illustrated, is an electrical heater having wires 32 which are connected with a source of current (not illustrated). Heater 31 operates in the usual manner and may contain a thermostat or any other usual means for maintaining a preset heat on upper plate 27. Lower pressure platen 28, likewise has a heater 33 which, as described above, is also connected through wires 34 to a source of current (not illustrated).

In order to control the amount of travel of platen 28 toward upper platen 27, shims are provided such as shim 35 and shim 36. Shims 35 and 36 provide a stop for lower platen 28 in its advance upward toward upper platen 27.

In the usual method of use, the assembly, as illustrated in FIG. 2, is placed on lower platen 28, then hydraulic ram 29 is actuated moving the assembly toward upper platen 27. Heaters 31 and 33 have been heating upper platen 27 and lower platen 28, respectively, to approximately 320 degrees F. Once the plastic strips strike upper platen 27, the heat is transferred to plastic strips 21 and uncured synthetic rubber portion 22. Lower heater 33, likewise, transfers heat through Bakelite matrix 10 to synthetic rubber portion 22 and plastic strips 21 and 23. Under heat and pressure plastic strips 21 and 23 will fuse to rubber portion 22 along the area coated by the polyvinyl chloride cement. Plastic strips 21 and 23 will also be forced into synthetic rubber portion 22, above described, and the entire assembly compressed until stops or shims 35 and 36 strike upper plate 27, whereupon any additional pressure will not apply additional pressure to plastic strips 21 and 23 and synthetic rubber portion 2. The entire assembly, however, will remain in a compressed condition for at least ten (10) minutes or until the synthetic rubber has become vulcanized and the plastic fused solidly to synthetic rubber portion 22. Once the ten (10) minute interval is completed, hydraulic ram 29 will be backed away from upper plate 27 and the assembly comprising Bakelite matrix 10, synthetic rubber portion 22 and plastic strips 21 and 23 will be removed and cooled. Once the assembly has cooled, the rubber/plastic combination is separated from Bakelite matrix 10. Excess flash is then trimmed from the band.

Under normal conditions, once the assembly has cooled, it is cut longitudinally through plastic 21, rubber 22 and through the remaining portion of plastic 23 to provide several bands for each molding In fact, in the present embodiment, up to eight (8) bands can be cut from a single molding Once the plastic strips have been cut to the proper width, then ends 37 and 38 are folded to form a means for gripping both flexographic press cylinder as illustrated in end 37 and the plastic sheet illustrated by end 38. Ends 37 and 38 are formed by pushing plastic strips 21 and 23 into heat forming bending apparatus. Once the plastic reaches a predetermined temperature, the ends are folded to form the "U" shaped ends illustrated in 37 and 38.

Referring to FIG. 5, a flexographic cylinder 40 is illustrated which has a first slot 41 and a second slot 42 formed longitudinally along its circumference. The plastic sheet which contains the rubber printing material affixed thereto is inserted into slot 42 and has a crimp much the same as that illustrated for end 37 in FIG. 4. Plastic sheet 43 is then wrapped around cylinder 40 until it reaches location 44.

A plurality of slots 45 are cut in plastic sheet 43 to accommodate end 38 of the elastic securing bands illustrated in FIG. 4. Once end 38 is inserted into slots 45, then remaining end 37 (see FIG. 4) is inserted into slot 41 by stretching synthetic rubber portion 22 by a sufficient amount to engage slot 41. Several bands, as illustrated, are placed along plastic sheet 43 as necessary determined by the size of the plastic sheet and the size of roll 40.

In order to accommodate various characteristics of flexographic cylinders 40 and various dimensions of plastic sheets 43, the elastic securing bands illustrated in FIG. 4 are made in various lengths. The process, however, remains the same, regardless of the length.

It is obvious, of course, that other modifications can be used and still be well within the spirit and scope of this invention as described in the specification and appended claims.

What is claimed is:

1. The process for making a tension belt for securing a printing plate to a flexographic press cylinder and wherein said tension belt has an elastic strip means having first and second ends, each end having contact portions, and a mid-portion, a first flexible plastic strip means having a contact side, a second flexible plastic strip means having a contact side, said process comprising:
   (a) coating a portion of each of said contact sides of said first and second plastic strip means with a solvent for said flexible plastic strip means;
   (b) placing said coated portion of said contact side of said first and second flexible plastic strip means in contact with said first and second end contact portions, respectively, of said elastic strip means,
   (c) applying heat and pressure to said first and second ends of said elastic strip means and to said mid portion, and to said first and second flexible plastic strip means over said contact sides, respectively, to fuse same, and;
   (d) forming said remaining portion of said first and second flexible plastic strip means in a manner so that said printing plate can be secured to said flexographic press cylinder.

2. The process for forming a tension belt for securing a printing plate to a flexographic press cylinder which tension belt includes a first end formed of a flexible plastic strip means, a second end formed of a second flexible plastic strip means, elastic band means having first and second ends and a mid-portion, said process comprising:

(a) coating a portion of one surface of each of said first and second flexible plastic strip means with a solvent for said first and second flexible plastic strip means;

(b) placing said first and second ends of said elastic band means in contact with said coated portion of said first and second flexible plastic strip means, respectively;

(c) applying heat and pressure to said first and second flexible plastic strip means and said elastic band means in a manner to fuse said first and second ends of said elastic band means to said coated portion of each of said first and second plastic strip means, respectively; and, (d) deforming said remaining portion of said first and second flexible plastic strip means to crease said plastic in a manner to form a fold, said fold being normal to the longitudinal axis of said elastic strip means;

whereby said flexible end portion can be utilized to secure said printing plate to a slot formed in the periphery of said flexographic press cylinder.

3. The process for forming a tension belt as described in claim 1 wherein heat and pressure has compressed said first and second flexible plastic strip means and said elastic band means to a thickness from 0.020 inches to 0.04 inches.

4. The process for forming a tension belt as described in claim 2 wherein said heat and pressure has compressed said first and second flexible plastic strip means and said elastic band means to a thickness from 0.020 inches to 0.40 inches.

5. The process for forming a tension belt as described in claim 1 wherein said elastic strip when fused to said flexible plastic strip means has a thickness from 0.060 inches to 0.125 inches after said fusing is completed.

6. The process for forming a tension belt as described in claim 2 wherein said elastic band means when fused to said flexible plastic strip means has a thickness from 0.060 inches to 0.125 inches after said fusing is completed.

7. A method for forming a strip used for connecting a plastic sheet to a flexographic press comprising:

(a) forming a mold for receiving plastic having a cavity therein with a length, width and depth dimensioned at least to the size of said strip;

(b) inserting a strip of uncured rubber dimensioned to fill said cavity, into said cavity;

(c) coating a pair of flexible plastic strips with a solvent for said plastic over at least a portion of said plastic strips;

(d) positioning the coated portion of said plastic strips on a portion of said uncured rubber; and, (e) applying heat and pressure by an amount necessary to vulcanize said uncured rubber and to fuse said plastic strips to said cured rubber.

8. The method as described in claim 7 including the step of:

(a) applying pressure using a vulcanizing press and having first and second platens; and, (b) limiting the travel of said platens during said application of said pressure.

* * * * *